United States Patent [19]

Yonekura et al.

[11] Patent Number: 4,992,976

[45] Date of Patent: Feb. 12, 1991

[54] METHOD OF ALLOCATING BOARD SLOT NUMBERS WITH ALTERING SOFTWARE

[75] Inventors: Mikio Yonekura, Hachioji; Jiro Kinoshita, Yamato, both of Japan

[73] Assignee: Fanuc Ltd, Minamitsuru, Japan

[21] Appl. No.: 501,306

[22] Filed: Mar. 23, 1990

Related U.S. Application Data

[63] Continuation of Ser. No. 143,134 filed as PCT JP87/00226 on Apr. 10, 1887, published as WO87/06369 on Oct. 22, 1987, abandoned.

[30] Foreign Application Priority Data

Apr. 18, 1986 [JP] Japan .................................. 61-89641

[51] Int. Cl.$^5$ ........................ G06F 13/14; G06F 12/10
[52] U.S. Cl. .................................. 364/900; 364/929.4; 364/929.5; 364/929.61; 364/929.71
[58] Field of Search ............... 364/200, 900, 480, 481, 364/488

[56] References Cited

U.S. PATENT DOCUMENTS

| | | | |
|---|---|---|---|
| 4,025,903 | 5/1977 | Kaufman et al. | 364/200 |
| 4,468,729 | 8/1984 | Schwartz | 364/200 |
| 4,484,273 | 11/1984 | Stiffler et al. | 364/200 |
| 4,489,414 | 12/1984 | Titherley | 371/20 |
| 4,545,010 | 10/1985 | Salas et al. | 364/200 |
| 4,562,535 | 12/1985 | Vincent et al. | 364/200 |
| 4,571,676 | 2/1986 | Mantellina et al. | 364/200 |
| 4,622,633 | 11/1986 | Ceccon et al. | 364/200 |
| 4,635,192 | 1/1987 | Ceccon et al. | 364/200 |
| 4,660,141 | 4/1987 | Ceccon et al. | 364/200 |
| 4,701,878 | 10/1987 | Günkel et al. | 364/900 |

FOREIGN PATENT DOCUMENTS

| | | |
|---|---|---|
| 54-16185 | 12/1979 | Japan . |
| 57-20192 | 12/1982 | Japan . |
| 58-22232 | 12/1983 | Japan . |
| 59-14493 | 8/1984 | Japan . |

Primary Examiner—David Y. Eng
Assistant Examiner—Robert B. Harrell
Attorney, Agent, or Firm—Staas & Halsey

[57] ABSTRACT

A method is provided of allocating board slot numbers in a control system composed of a plurality of boards which are subject to a variation in number and type. Slot numbers (12), in a maximum system (10) are determined to prepare software, and module identification numbers (13-18) of the boards at respective slots in a particular system (20) are read out. The read-out modules are converted to slot numbers (22) in the maximum system (10). Software in the maximum system can thus be executed without alteration.

1 Claim, 5 Drawing Sheets

METHOD OF ALLOCATING BOARD SLOT NUMBERS WITH ALTERING SOFTWARE

This is a continuation of copending application Ser No. 07/143,134 filed as PCT JP87/00226 on Apr. 10, 1987, published as WO87/06369 on Oct. 22, 1987 now abandoned.

BACKGROUND OF THE INVENTION

The present invention relates to a method of allocating board slot numbers, and more particularly to a method of allocating board slot numbers without altering software in a computer control system which is subject to system structure variations.

Generally, a computer control system uses a number of boards and may be subject to a system structure variation dependent on an object to be controlled. When the address map is required to vary by a system structure, the compatibility of software is lost even if the system structure is subordinate, and new software should be formed or software should be converted. However, the development of software requires the expenditure of considerable time and cost, and the conversion of software is not easy to perform.

It is therefore necessary to have the address map unchanged even if the system structure varies. This requires an addressing process for each board when the device is assembled, but such a process is troublesome.

It is customary to input board slot numbers from a back panel connector so that addressing can automatically be effected dependent on a slot position on a back panel. One solution to keep the same address map for all system structures is to use the same back panel for maximum and minimum systems. Each board is mounted on the slot corresponding to its address. However, when the difference between maximum and minimum systems is large, it would be quite wasteful if the same back panel were employed.

SUMMARY OF THE INVENTION

It is an object of the present invention to provide a method of allocating board slot numbers which will solve the aforesaid problems, does not require a manual board adressing procedure, and allows a subordinate system to use the software of a maximum system without altering the software.

In order to solve the aforesaid problems, there is provided in accordance with the present invention a method of allocating board slot numbers in a control system composed of a plurality of boards which are subject to a variation, the method comprising the steps of determining slot numbers in a maximum system to prepare software, reading out the module identification symbols of the boards at respective slots in a particular system, converting the read-out modules to slot numbers in the maximum system: and executing the software in the maximum system without alteration.

According to the above method, the module of each of the boards is automatically identified and converted to a slot number in the maximum system. Therefore, the software of the maximum system can be used for a different system which has a different number of modules and a different module type.

DESCRIPTION OF THE PREFERRED EMBODIMENT

An embodiment of the present invention will hereinafter be described in specific detail with reference to the drawings.

Figure 1:
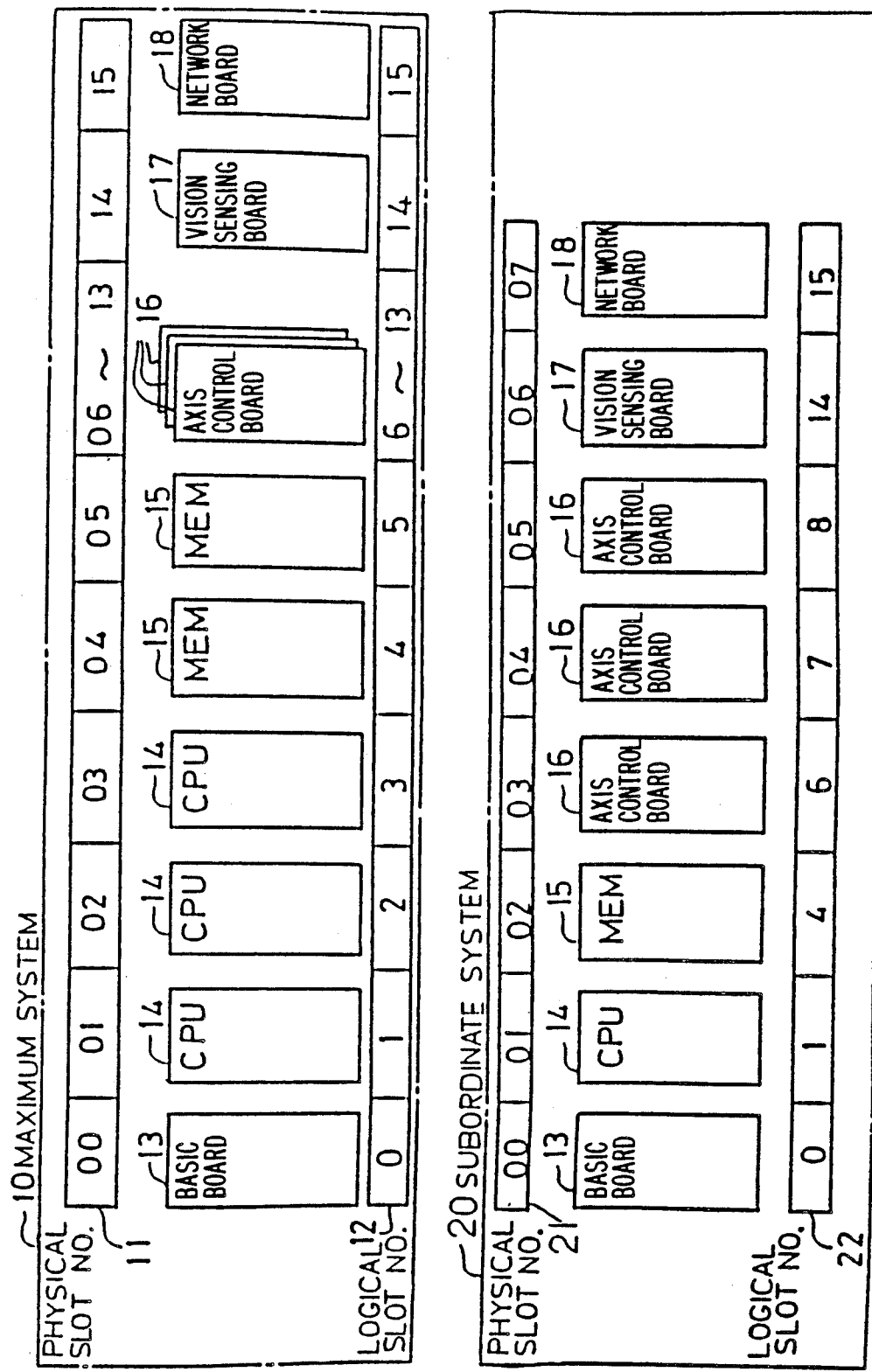
FIG. 1 is a diagram of the relationship between slot numbers and boards on back panels according to an embodiment of the present invention.

FIG. 1 shows the relationship between slot numbers and boards on back panels according to an embodiment of the present invention. In FIG. 10 is a maximum system in which the slot numbers and boards are arranged. Physical slot numbers are denoted at 11. Boards having various functions are designated by 13 through 18 and defined as follows:

13 . . . B; Basic board
14 . . . CPU; CPU boards
15 . . . MEM; Memory boards
16 . . . AXC; Axis control boards
17 . . . VS; Vision sensing board
18 . . . NET; Network board Denoted at 20 is a particular subordinate system having eight slot numbers represented by 21 as physical slot numbers. Denoted at 13 through 18 are boards having various functions similar to those of the maximum system 10. The numeral 22 indicates logical slot numbers. The logical slot numbers 22 in the subordinate system are converted so that they will coincide with the physical slot numbers 11 and logical slot numbers 12 in the maximum system 10.

Software prepared for the maximum system 10 can operate the hardware of the subordinate system 20 since it has the same board arrangement on the back panel as that of the hardware of the maximum system 10. In the subordinate system 20, however, the software should be designed in advance such that the CPU will not access boards which are not actually mounted.

Conversion from the physical slot numbers to the logical slot numbers will be described below.

Figure 2:
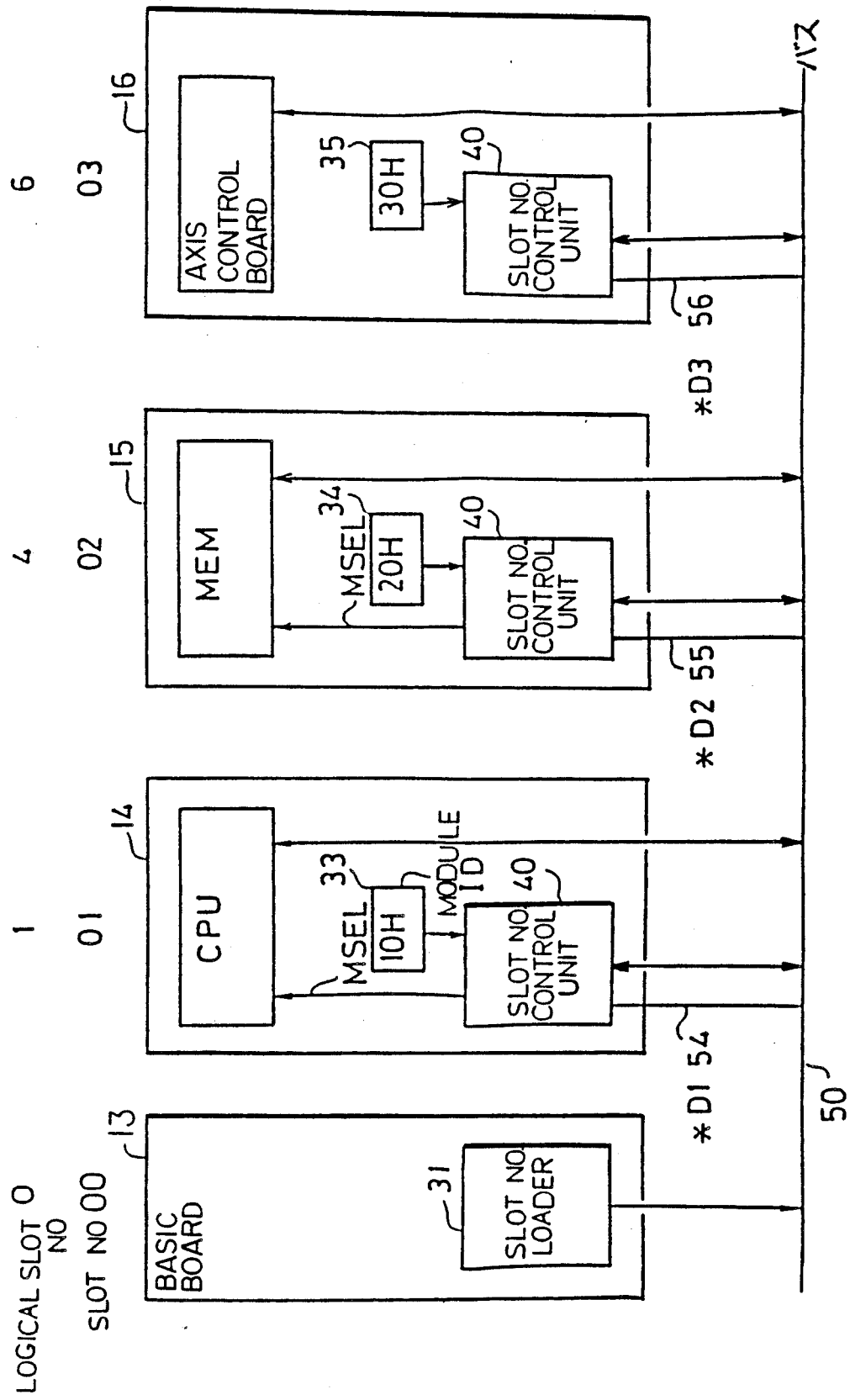
FIG. 2 is a block diagram of boards in a subordinate system.

FIG. 2 is a block diagram of the boards in the subordinate system 20. Denoted at 13 through 16 in FIG. 2 are the same boards as shown in FIG. 1. The basic board 13 contains a slot number loader 31 which, when the power supply is switched on, gives physical slot numbers to the boards at respective slots. The boards 14, 15 and 16 have slot number control units 40, respectively. Each slot number control unit 40 serves to send a module identification number (described later) to the slot number loader 31 and also to convert an address accessed by a logical slot number to an actual address. The boards 14, 15 and 16 also contain module identification numbers 33, 34, and 35, respectively. The boards 13, 14, 15 and 16 are interconnected by a bus 50. To the boards 14, 15 and 16, there are connected the respective bits of data lines *D1-54, *D2-55, and *D3-56, in corresponding relation to the physical slot numbers. More specifically, the data line *D1 is connected for the physical slot number 1, the data line *D2 is connected for the physical slot number 2, and so on. These signals are used to read out the module identification numbers of the respective boards when the power supply is turned on.

Figure 3:
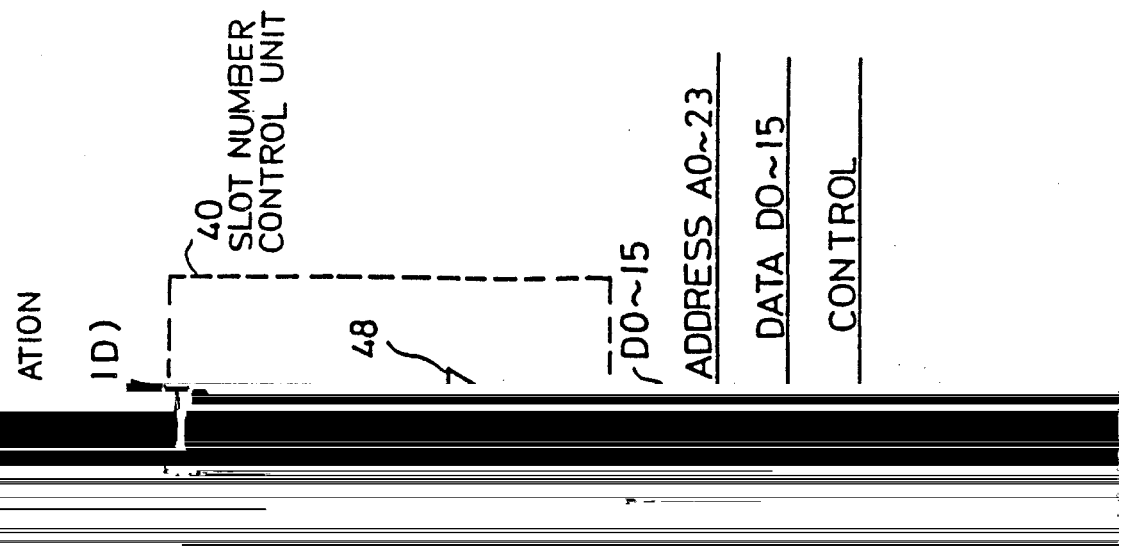
FIG. 3 is a detailed block diagram of a slot number control unit 40.

The slot number control unit 40 will be described below in detail. FIG. 3 is a circuit diagram of the slot number control unit 40. An address decoder 41 has an input line A0-23 supplied with 0 to 23 bits from an address bus and produces an output signal which becomes a logic "1" when a corresponding address is applied. For example, 8XXXXXH indicates a hexadecimal notation of an address having 24 bits, the high-order position being 8 and other positions being any desired numbers. H in the low-order position indicates the hexadecimal representation. Likewise, F0000XH indicates that five high-order digits represent a hexadecimal F0000 and the low-order digit may be any number. A slot number storage register 42 first stores a physical slot number and then a logical slot number. comparators 43 and 44, connected to the slot number storage register 42 and the address bus produce coincidence signals when signal data items, applied thereto from the slot number register 42 and the address bus, are the same. Denoted at 45, 46 and 47 are AND gates, 48 a bus driver for issuing a module identification number to a data bus, 51 an address bus which is 24 bits according to the present embodiment, 52 a data bus which is 16 bits according to the embodiment, and 53 a control signal line for writing in and reading out data with a write signal *WR and a read signal *RD.

Figure 4:
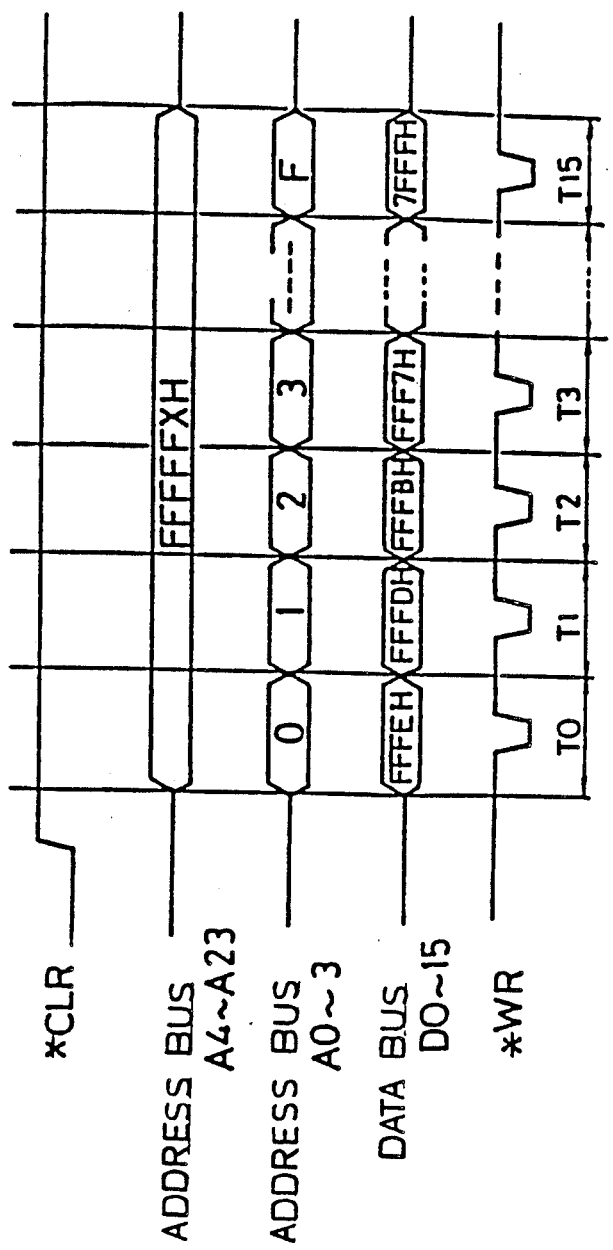
FIG. 4 is a timing diagram for a slot number loader.

Operation of the slot number loader 31 shown in FIG. 2 will be described with reference to the timing chart shown in FIG. 4. A clear signal *CLR in FIG. 4 serves to initially clear the entire circuit for a certain period of time when the power supply is switched on. An address bus A4-23 indicates signals from 4 to 23 bits on the address bus and controls the address bus so that its output will be FFFFFXH during a timing interval from T0 to T15. As a result, the signal FFFFFXH is a "1" from the time T0 to the time T15. An address bus A0-3 indicates signals from 0 to 3 bits on the address bus and controls the bits so that the bit will be 0 at the time T0, 1 at the time T1, and 2 at the time T2. A data bus D0-15 is controlled such that the low-order bit will be 0 at the time T0, the bit next to the low-order bit will be 0 at the time T1, and the second bit from the low-order bit will be 0 at the time T2. Data D1 is connected to the first slot, and data D2 is connected to the second slot. The data are given as timing signals to the first through 15th slots from the time T1 through the time T15. Since the back panel in the subordinate system 20 has 15 or less slots, not all data up to the time T15 may be needed in some cases. *WR indicates a control signal for writing in data.

Writing a physical slot for the board connected to the first slot on the back panel will be described below.

In FIG. 3, at the time T1, the input FFFFFXH to the gate 46 is "1" and the write signal *WR is "0". Since the data D1 is connected to the first slot, a signal *IDS also "0". Therefore, the output from the gate 46 is "1", and the contents of the address bus A0-3 are written in the slot number register 42. At the time T1, since the contents of the address bus A0-3 are "1", "1" is written into the slot number register 42. For the other boards, the physical slot numbers of the slots in which the boards are inserted are written in a similar manner into the slot number register 42.

Conversion from the physical slot numbers to the logical slot numbers will now be described. After the writing of the physical slot number into the slot number register of each board has been completed, control is transferred from the basic board 13 to a predetermined CPU. The CPU reads out the module identification numbers of the respective boards, and forms tables of the physical slot numbers and the module identification numbers in a local memory in the CPU. At this time, as shown in FIG. 3, the input signal F0000XH applied to the gate 47 is "1". When the output from the slot number register 42 and the signal on the address bus A0-3 are in agreement with each other as compared by the comparator 44, the comparator 44 outputs a signal "1". At the same time, the read signal *RD becomes "0", so that the module identification number is read out to the data bus through the bus driver 48.

Figure 5:
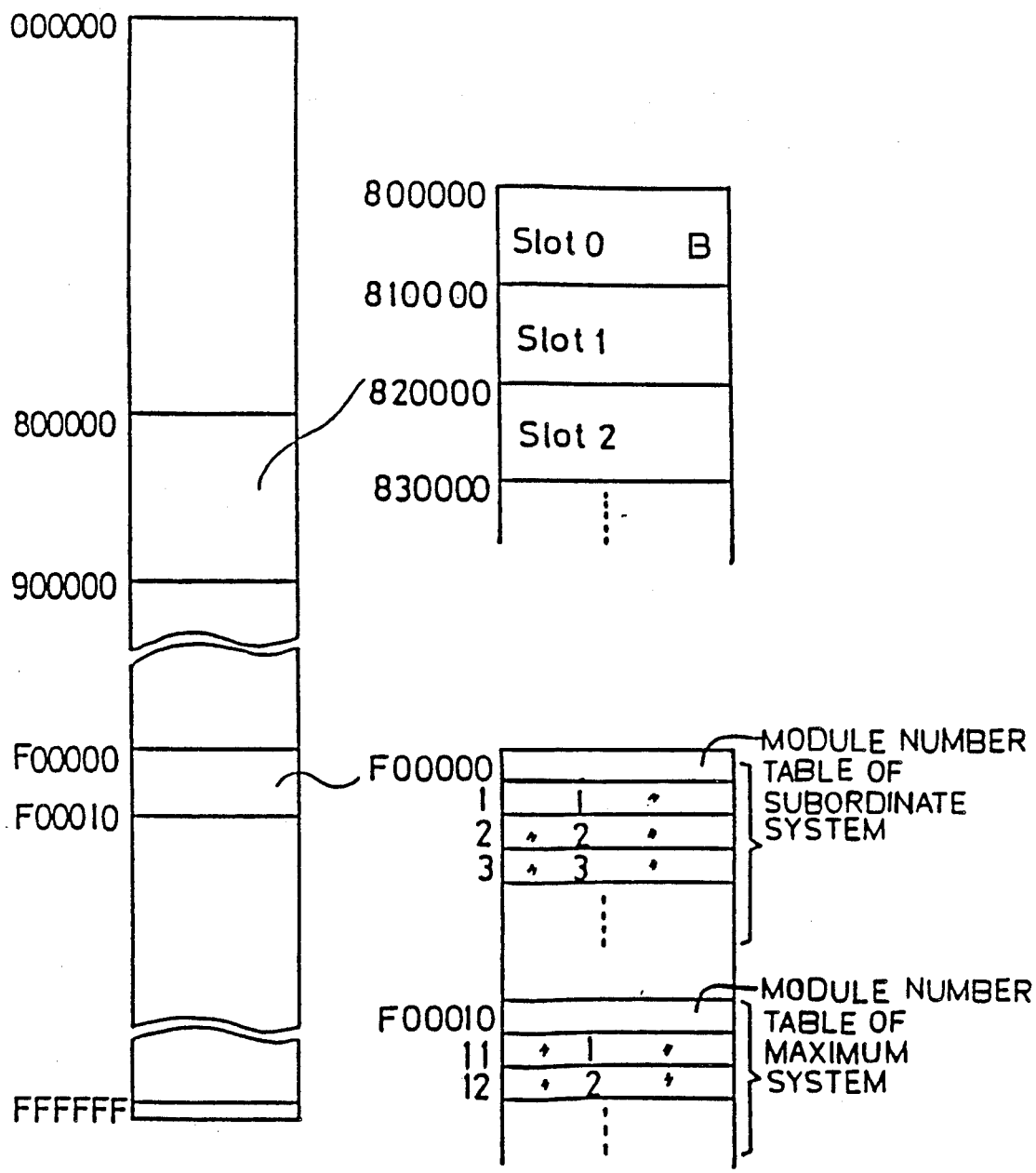
FIG. 5 is a diagram of an address map according to the embodiment of the present invention.

FIG. 5 shows an address map according to the present invention. The address map contains addresses 000000 through FFFFFF, and addresses 800000 through 900000 are allocated to the slots. The tables of the physical slot numbers and the module identification numbers are preset at addresses F00000 through F0000F. Correspondence tables of the logical slot numbers and the module identification numbers in the maximum system are present at addresses F00010 through F0001F.

The CPU compares the tables of the subordinate system 20 and those of the maximum system 10, and allocates the slot numbers, i.e., the logical slot numbers of the maximum system 10 to the same modules of the subordinate system 20. Specifically, as shown in FIG. 3, when the input signal FFFFXH, applied to the gate 46, becomes "1", the write signal *WR becomes "0", and the signal *IDS becomes "0", the logical slot numbers are stored in the slot number register 42 and also in the slot number registers 40 on the respective boards.

Operation when the boards are accessed will be described. As shown in FIG. 5, the slots are allotted to the addresses 800000 through 900000. When the address 800000 is selected, i.e., when the input signal 8XXXXXH to the gate 45 becomes "1" and the output from the comparator 43 becomes "1" at the time the logical slot number stored in the slot number register 42 and addresses A16-19 coincide with each other (FIG. 3), the output from the gate 45 becomes "1". In adddition, a module selecting signal becomes "1" to access the units in the boards. Thus, the boards which are actually accessed are not fixed boards, but the boards corresponding to the modules which coincide with the prescribed modules in the maximum system are selectively accessed.

In the above description, the physical slot numbers are converted to the logical slot numbers by a fixed CPU. However, where there are a plurality of CPUs available, such conversion may be effected after a host CPU is determined among the available CPUs.

Heretofore, the selection signal *IDS for the respective boards has been a 4-bit signal. In the embodiment, the selection signal *IDS is a 1-bit signal.

With the present invention, as described above, the modules of the respective boards are converted so that, they can be accessed by the slot numbers of the modules in the software of the maximum system 10. Consequently, the software of the maximum system 10 can be used without being altered or converted. The present invention is therefore highly useful in promoting the development of software in a system that is subject to system structure variations.

The device can be assembled simply by inserting boards which are of one type into a back panel without having to involve a tedious manual addressing procedure or the like. This is advantageous since a board replacement process is facilitated upon maintenance.

The many features and advantages of the invention are apparent from the detailed specification and thus, it is intended by the appended claims to cover all such features and advantages that fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

We claim:

1. A system provided with a back panel having slots, the back panel having a plurality of boards, for performing various functions, mounted in respective slots, each of the slots having a first physical slot number indicating locations of the slots in which the plurality of boards are actually mounted, the first physical slot numbers are referred to as logical slot numbers indicating addresses of the plurality of boards, software created based on the logical slot numbers controls the system, a control system is provided for automatically converting second physical slot numbers, set after replacement of the back panel, to logical slot numbers when replacement of the back panel causes the first physical slot numbers not to be in agreement with the second physical slot numbers, said system comprising:

a plurality of buses including an address bus, data bus and control signal bus;

a basic board containing a slot number loader for assigning the second physical slot numbers to respective boards corresponding to said logical slot numbers when a power supply of said control system is switched on;

a plurality of boards interconnected by said address bus, each of said boards including:

a slot number control unit for converting each of the second physical slot numbers to logical slot numbers and selectively accessing one of said plurality of boards corresponding to one of the logical slot numbers when accessed by the logical slot numbers; and means, connected to said slot number control unit, for assigning a module identification number, indicating a function of each of said plurality of boards, to said slot number control unit and supplying said module identification number to said slot number loader, said slot number control unit comprising:

an address decoder, coupled to said address bus, for producing first, second and third signals in accordance with address data on said address bus;

a slot number storing register, coupled to said address bus and said address decoder, for storing any one of the second physical slot numbers and the logical slot numbers;

a first comparator, coupled to said slot number storing resister and said address bus, for receiving data from said slot number storing register and address data from said address bus and producing a first coincidence signal when the data in address data coincide;

a second comparator, coupled to said slot number storing register and said address bus, for receiving data from said slot number storing register and address data from said address bus corresponding to the second one of the physical slot numbers and the logical slot numbers and producing a second coincidence signal when the data and address data coincide;

a first AND circuit, coupled to said address decoder and said slot number storing register, for receiving said first signal from said address decoder and said first coincidence signal from said first comparator and producing an AND signal thereof as a selection signal from each of said plurality of boards;

a second AND circuit, coupled between said address decoder and said slot number storage register and coupled to said data bus and said control signal bus, for receiving said second signal from said address decoder, a control signal from said control signal bus and data from said data bus and for supplying an AND signal to said slot number storing register to set a data address of said address bus to said slot number storing register; and a third AND circuit, coupled to said address decoder, said second comparator and said control signal bus, for receiving said third signal from said address decoder, said control signal and said second coincidence signal from said second comparator and for supplying a module identification number to said data bus; and control means provided in any one of said plurality of boards and coupled to said slot number control unit, for reading said module identification number from each of said plurality of boards, converting the second physical slot number to one of said logical slot numbers in accordance with said module identification number and storing the module identification number in said slot number storing register after the second physical slot number is stored in said slot number storing register of each of said plurality of boards by said basic board.

* * * * *

UNITED STATES PATENT AND TRADEMARK OFFICE
CERTIFICATE OF CORRECTION

PATENT NO. : 4,992,976
DATED : FEBRUARY 12, 1991
INVENTOR(S) : MIKIO YONEKURA ET AL.

It is certified that error appears in the above-identified patent and that said Letters Patent is hereby corrected as shown below:

Col. 2, line 17, "FIG. 10" should be --FIG. 1, 10--.

Signed and Sealed this

Twenty-first Day of July, 1992

*Attest:*

DOUGLAS B. COMER

*Attesting Officer*   *Acting Commissioner of Patents and Trademarks*